US012325260B1

(12) United States Patent
Perrier

(10) Patent No.: US 12,325,260 B1
(45) Date of Patent: *Jun. 10, 2025

(54) DIAMOND ART DRILL MLULTIPLACER HEAD

(71) Applicant: Diamond Art Club, LLC, Miami, FL (US)

(72) Inventor: Alexandre Perrier, Miami, FL (US)

(73) Assignee: Diamond Art Club, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,818

(22) Filed: Apr. 18, 2024

Related U.S. Application Data

(63) Continuation of application No. 18/532,854, filed on Dec. 7, 2023, now Pat. No. 11,987,070.

(51) Int. Cl.
*B44D 3/22* (2006.01)

(52) U.S. Cl.
CPC .................................... *B44D 3/22* (2013.01)

(58) Field of Classification Search
CPC ....................................................... B44D 3/22
See application file for complete search history.

(56) References Cited

U.S. PATENT DOCUMENTS

| | | | | |
|---|---|---|---|---|
| 11,987,070 B1 * | 5/2024 | Perrier | B44D 3/22 | |
| 2023/0211414 A1 * | 7/2023 | Zhan | B22F 3/24 | 419/6 |

FOREIGN PATENT DOCUMENTS

| | | | |
|---|---|---|---|
| CN | 206938309 U | * | 1/2018 |
| CN | 218702437 U | * | 3/2023 |
| CN | 219988880 U | * | 11/2023 |
| JP | 3177556 U | * | 8/2012 |

* cited by examiner

*Primary Examiner* — Yaritza Guadalupe-McCall
(74) *Attorney, Agent, or Firm* — DANE IP Law PC

(57) ABSTRACT

A diamond art drill multiplacer head is disclosed. The multiplacer head may have a tip structure with a wax well having a width less than the cross-sectional dimensions of conventional diamond drills/beads. The tip structure may also have an external width that is also less than the cross-sectional dimensions of the conventional diamond drills and have a thin body thickness. As a result of such dimensions, diamond drills may not get stuck in the wax well of the tip structure and a user may see the outer edges of the diamond drills when placing them on a diamond are painting canvas.

10 Claims, 10 Drawing Sheets

DIAMOND ART DRILL MLULTIPLACER HEAD

CROSS-REFERENCE TO RELATED APPLICATIONS

This application is a continuation of U.S. patent application Ser. No. 18/532,854, filed on Dec. 7, 2023, the entire contents of which are expressly incorporated herein by reference.

STATEMENT RE: FEDERALLY SPONSORED RESEARCH/DEVELOPMENT

Not Applicable

BACKGROUND

The various aspects and embodiments described herein relate to a drill multiplacer head for diamond art painting and a system and method of using thereof.

Diamond art painting requires the meticulous placement of hundreds and thousands of diamond painting drills/beads on a diamond art painting canvas using a diamond art painting pen. The conventional method of placing diamond drills on the diamond art painting is using the single placer head of a diamond art painting pen. However, the usage of a multiplacer head to place multiple diamond drills at the same time on the canvas may speed up the painting process.

Accordingly, there is a need in the art for an improved device, system, and method for a drill multiplacer head for diamond art painting.

BRIEF SUMMARY

The various embodiments and aspects disclosed herein address the needs discussed above, discussed below and those that are known in the art.

A diamond art drill multiplacer head is disclosed. The multiplacer head may have a tip structure with a wax well for picking up multiple diamond drills/beads at the same time. The wax well may have a width less than the cross-sectional dimensions of the conventional diamond drills that are designed to be picked up by the multiplacer head. The tip structure may also have an external width that is also less than the cross-sectional dimensions of the conventional diamond drills and have a thin body thickness. As a result of such dimensions, diamond drills may not get stuck in the wax well of the tip structure and a user may see the outer edges of the diamond drills when placing them on a diamond art painting canvas. The tip structure may also be made out of a metallic material, such as stainless steel. The usage of stainless steel may be necessary to increase the durability of the multiplacer head, especially since the tip structure is designed to have a thin body thickness.

More particularly, a multiplacer head for a diamond art painting pen is disclosed that may have a supporting body having an attachment shaft on one end and a multiplacer tip structure on another end of the supporting body, the mutliplacer tip structure may have a top longitudinal side, a bottom longitudinal side, a left lateral side, a right lateral side, and a wax well therebetween, the top and bottom longitudinal sides may each have a wall thickness in the range of 0.22 to 0.30 mm, and the wax well may have a width between 1.68 mm and 2.24 mm measured from an inner surface of the top longitudinal side and an inner surface of the bottom longitudinal side.

In some embodiments, the wax well may have a length in the range of 10.0 mm to 36.4 mm measured from an inner surface of the left lateral side and an inner surface of the right lateral side. In some embodiments, the multiplacer head may be made from stainless steel. In some embodiments, the multiplacer tip structure and the wax well may each have a stadium-shaped cross-section. In some embodiments, the wax well may have a well depth in the range of 2.0 to 6.0 mm.

In some embodiments, the supporting body may have a cylindrical shaft section between the multiplacer tip structure and the attachment shaft. In some embodiments, the cylindrical shaft section may have a wide shaft portion proximate to the attachment shaft and a narrow shaft portion proximate to the multiplacer tip structure. In some embodiments, the cylindrical shaft section may have a tapering portion between the wide and narrow shaft portions. In some embodiments, the tapering portion may conically reduce a shaft thickness of the cylindrical shaft section from the wide shaft portion to the narrow shaft portion.

In some embodiments, the attachment shaft may have a cross-sectional diameter less than a bore diameter of the diamond art painting pen such that the attachment shaft is loosely insertable inside a bore of the diamond art painting pen.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
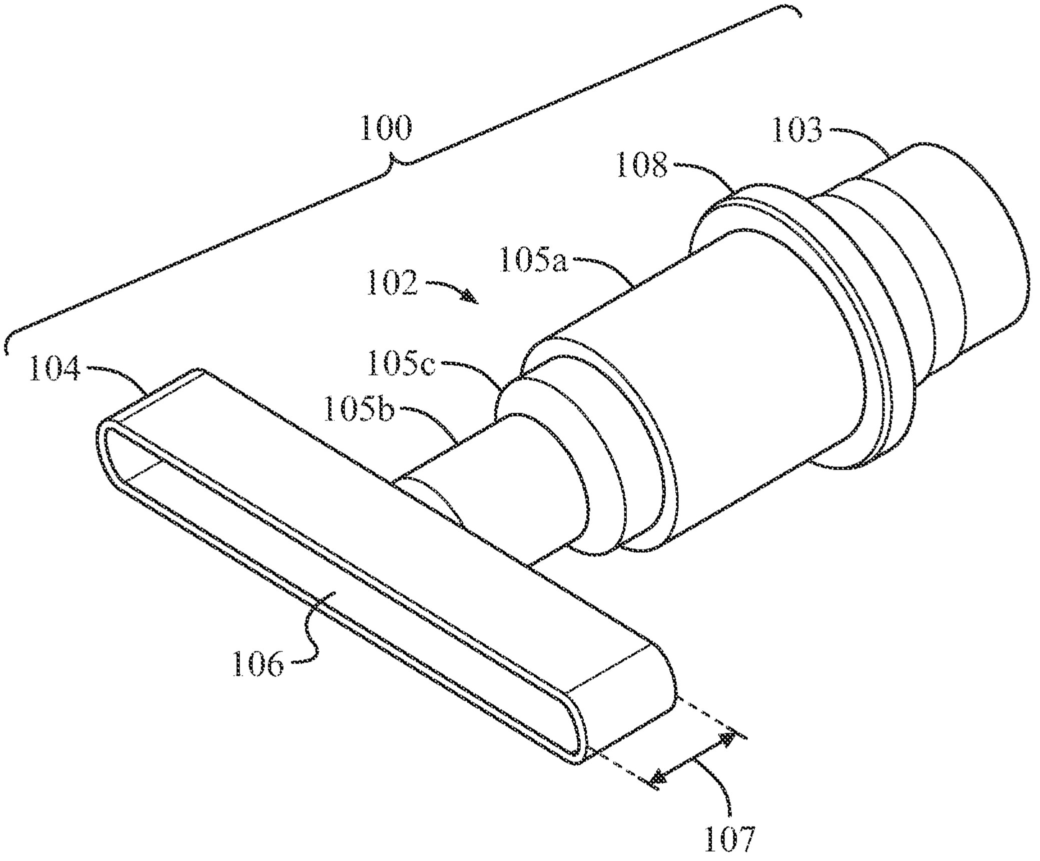
FIG. 1A shows a perspective view of a diamond drill multiplacer head.
Figure 1B:
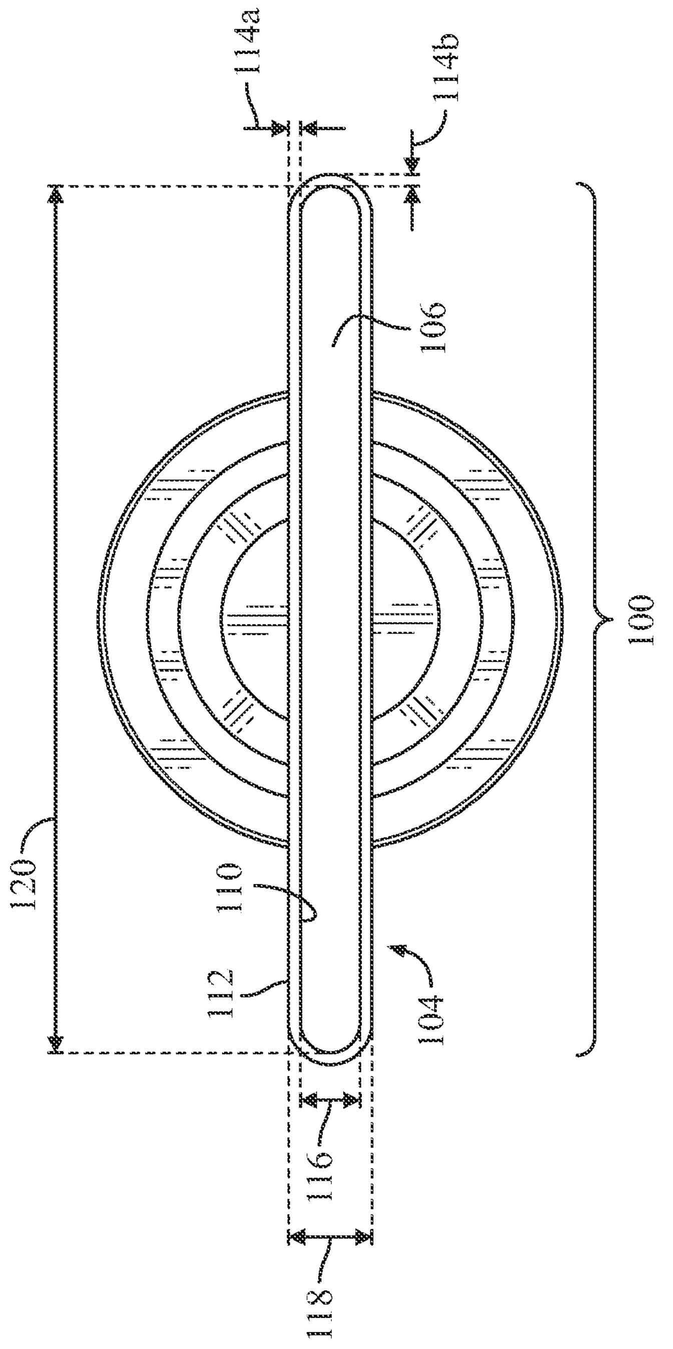
FIG. 1B shows a front view of the diamond drill multiplacer head.

Referring now to the figures, a diamond drill multiplacer head 100 and a method of using thereof is disclosed. As shown in FIG. 1A, the multiplacer head 100 may have a supporting body 102 between an attachment shaft 103 and a multiplacer tip structure 104. As shown in FIG. 1B, the multiplacer tip 104 may have a specific internal width 116, external width 118, and body thicknesses 114$a$-$b$ that makes the picking up and placement of diamond drills/beads easier.

Figure 2:
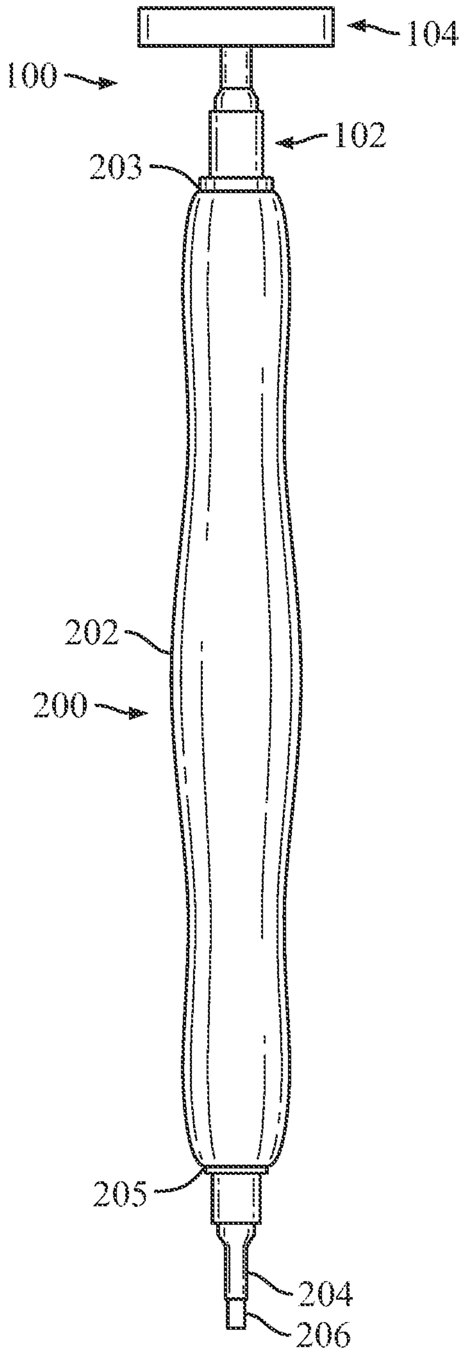
FIG. 2 shows a perspective view of a diamond art painting pen having the multiplacer head attached thereto.
Figures 3A, 3B:
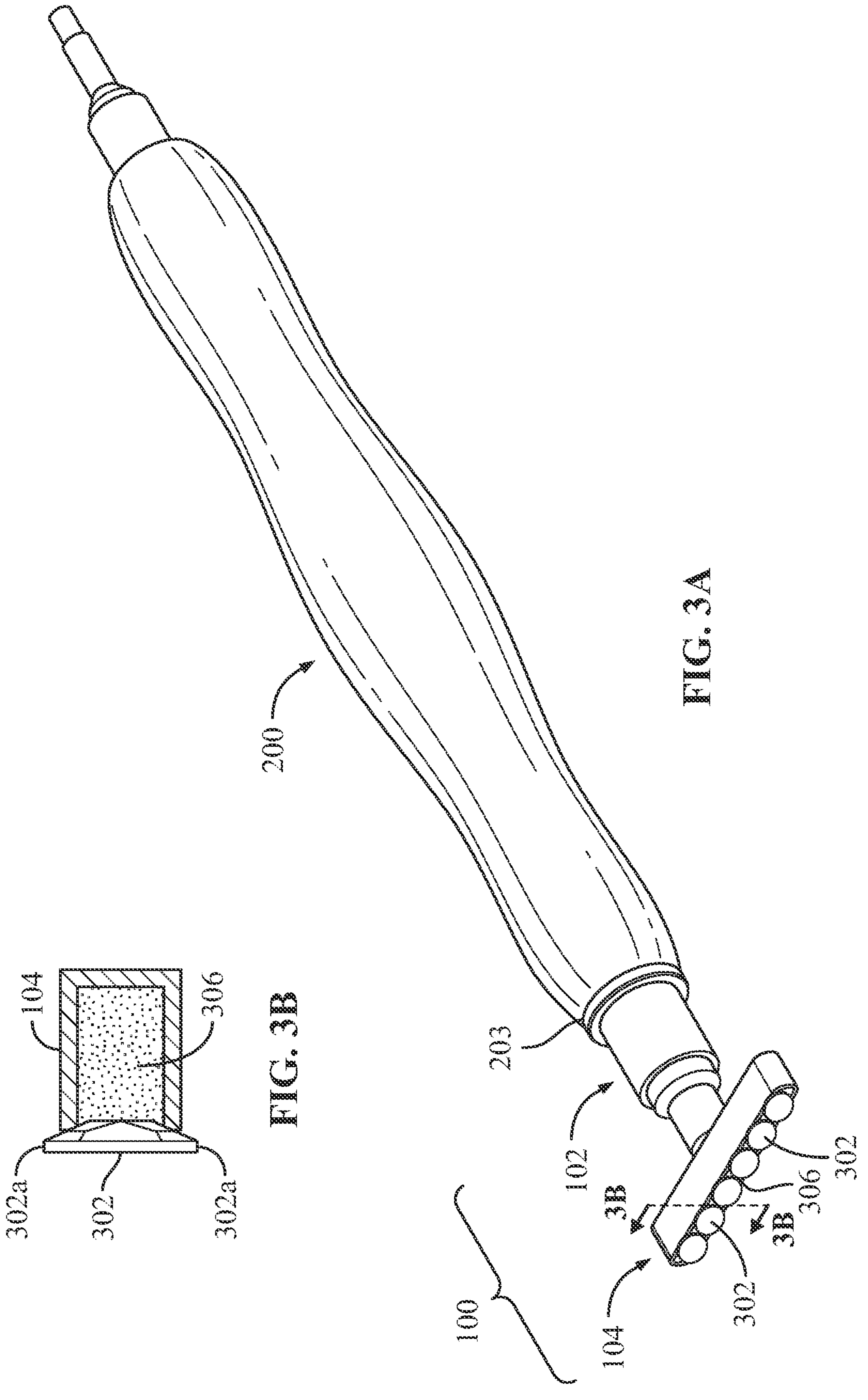
FIG. 3A shows the diamond art painting pen picking up multiple round diamond drills with the multiplacer head.
FIG. 3B shows the cross-sectional view of the multiplacer tip structure of FIG. 3A having the edges of the round diamond drills extending outward from said structure.
Figure 3C:
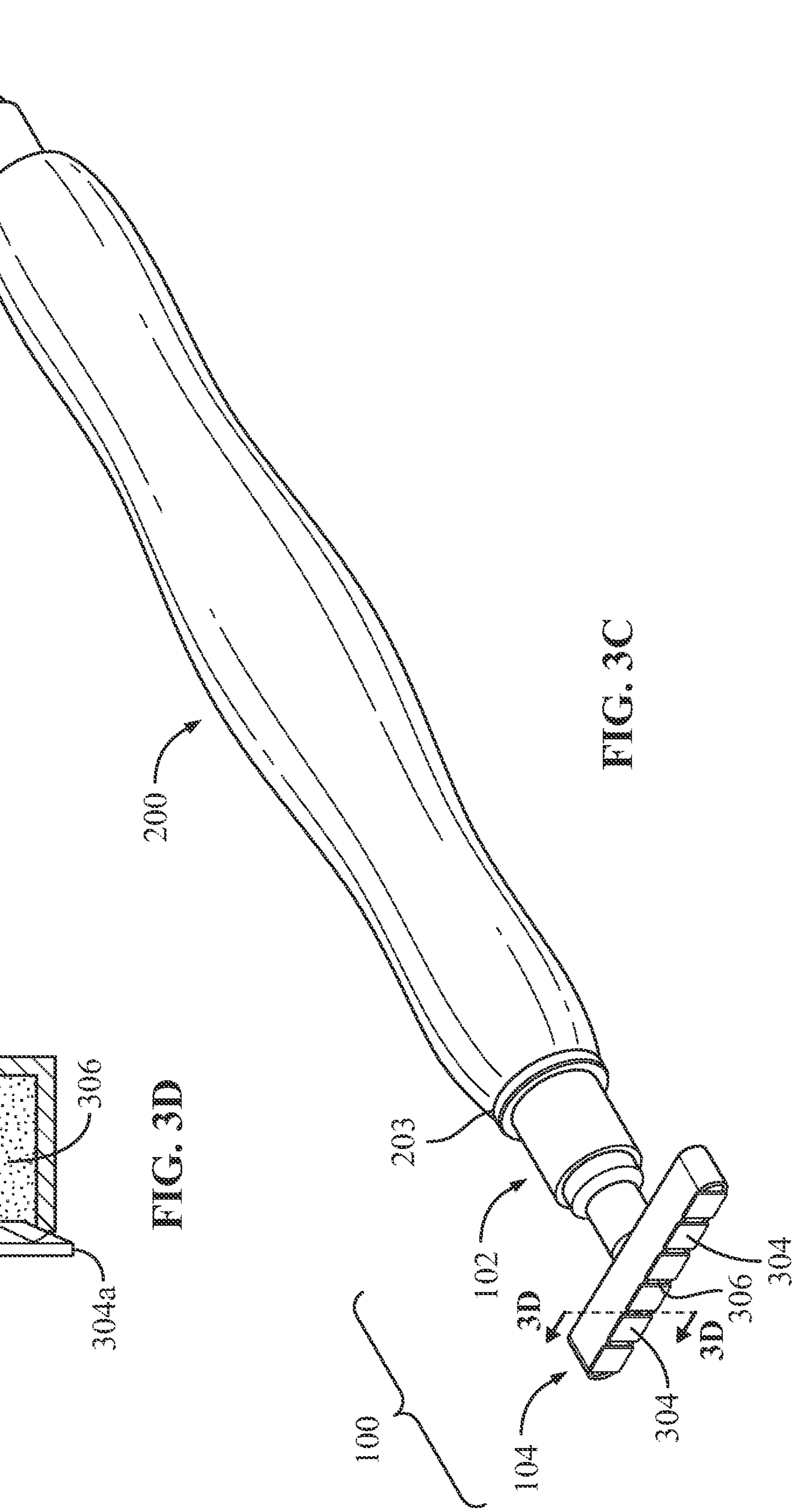
FIG. 3C shows the diamond art painting pen picking up multiple square diamond drills with the multiplacer head.
Figure 3D:
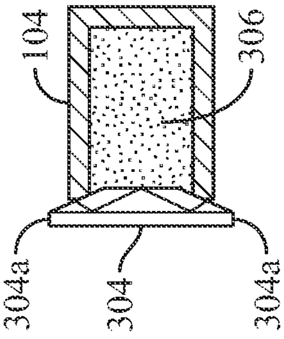
FIG. 3D shows the cross-sectional view of the multiplacer tip structure of FIG. 3B having the edges of the square diamond drills extending outward from said structure.
Figure 4A:
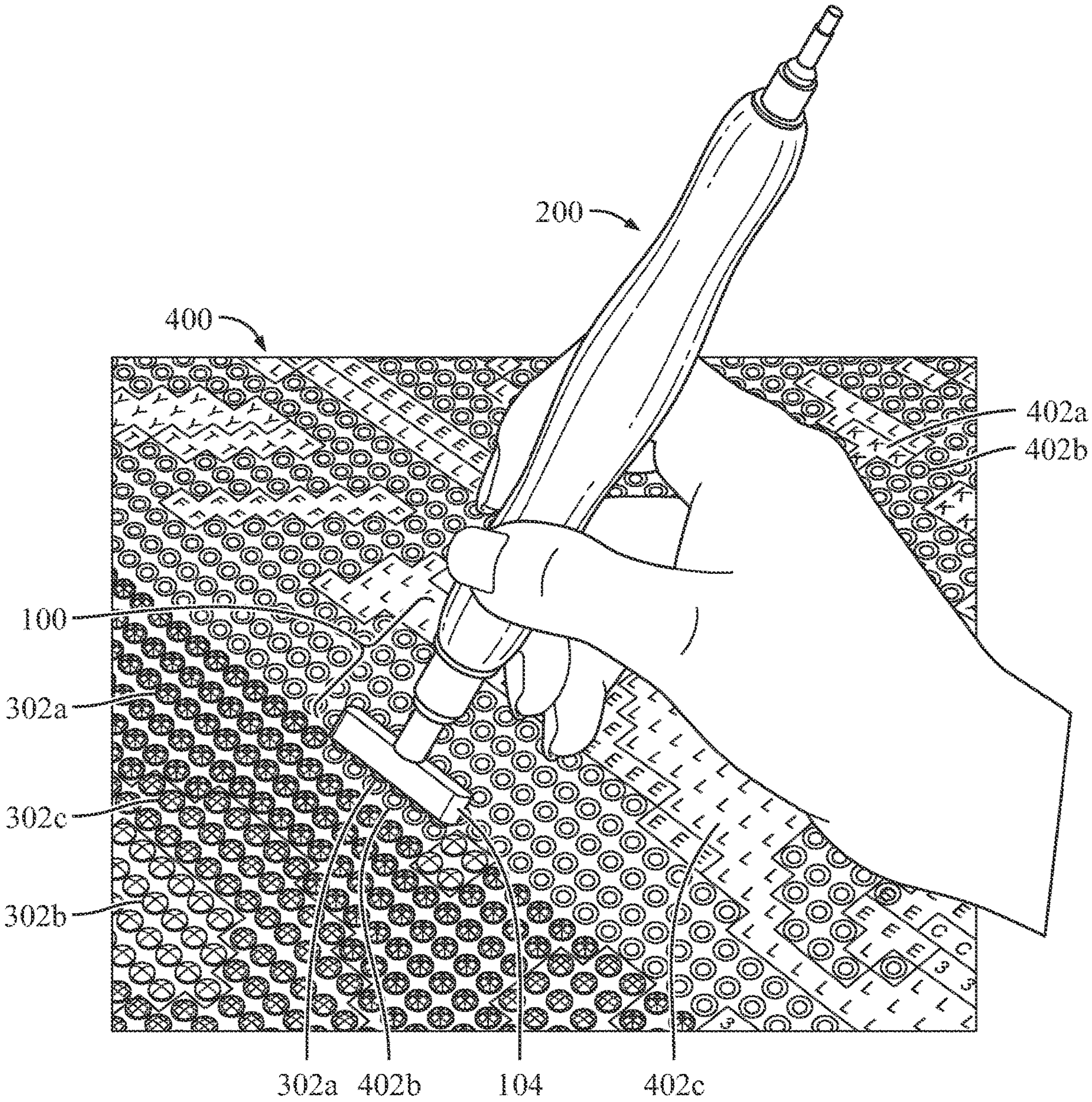
FIGS. 4A-B show the usage of the multiplacer head in placing multiple diamond drills on a diamond art painting canvas.
Figure 4B:
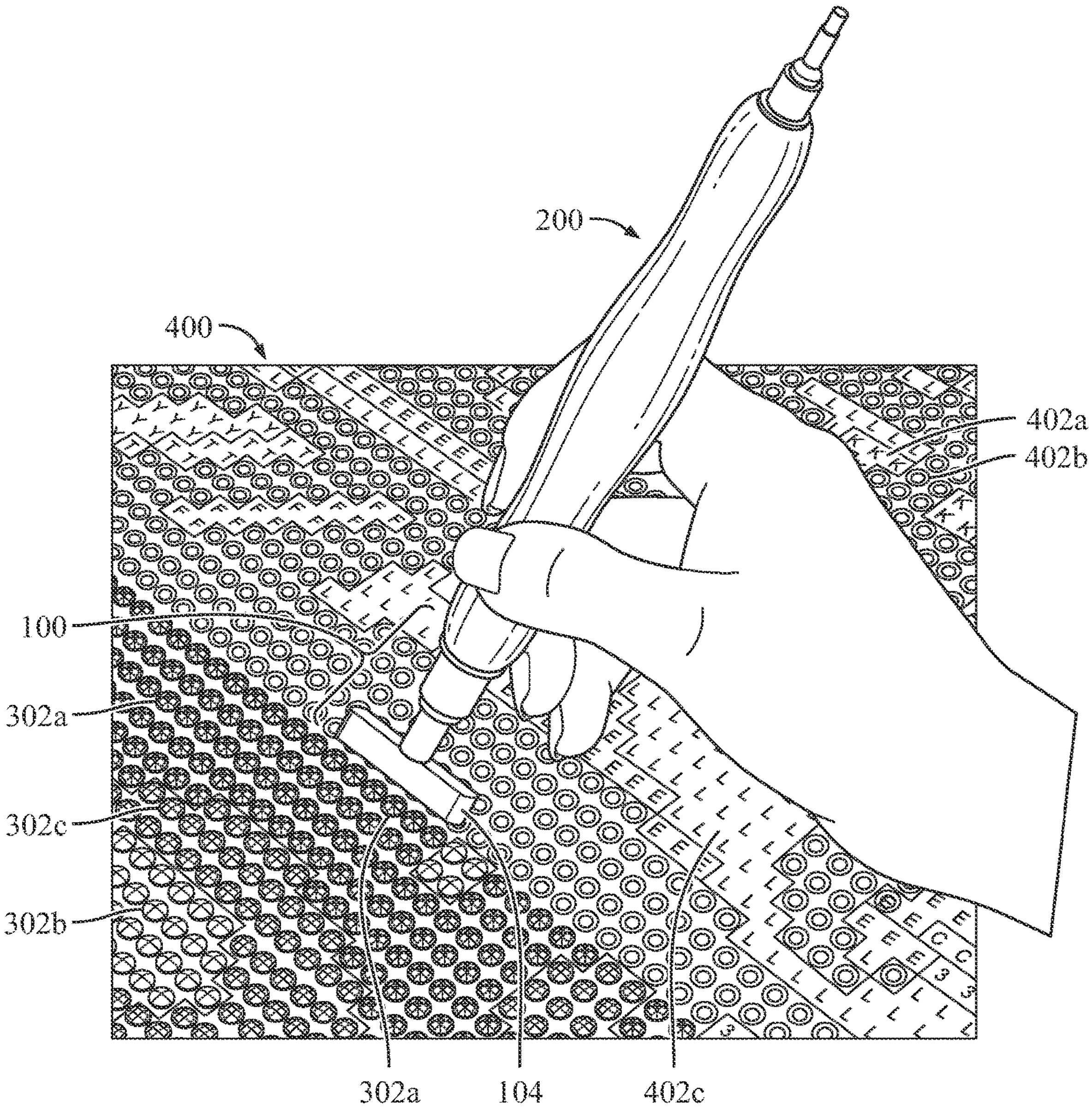
Figure 5A:
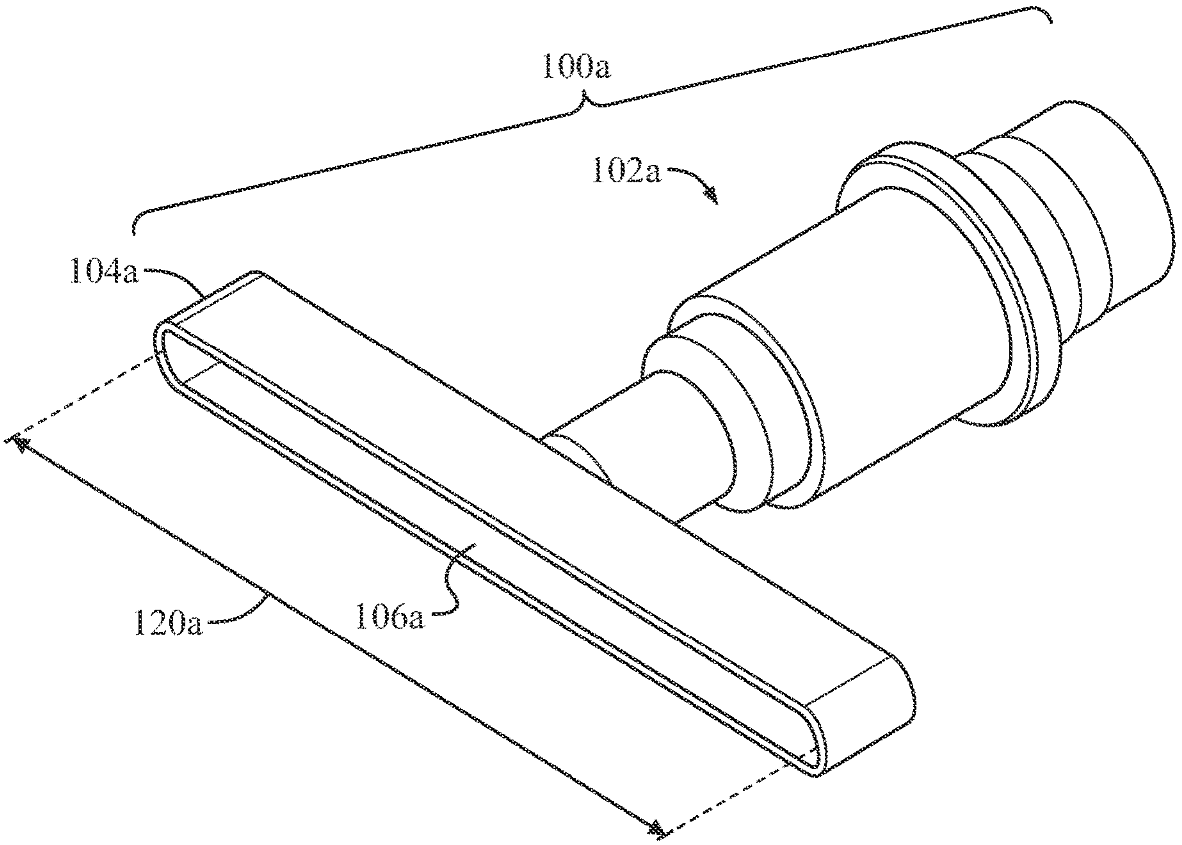
FIGS. 5A-B show different multiplacer heads having different lengths for picking up different amounts of diamond drills.
Figure 5B:
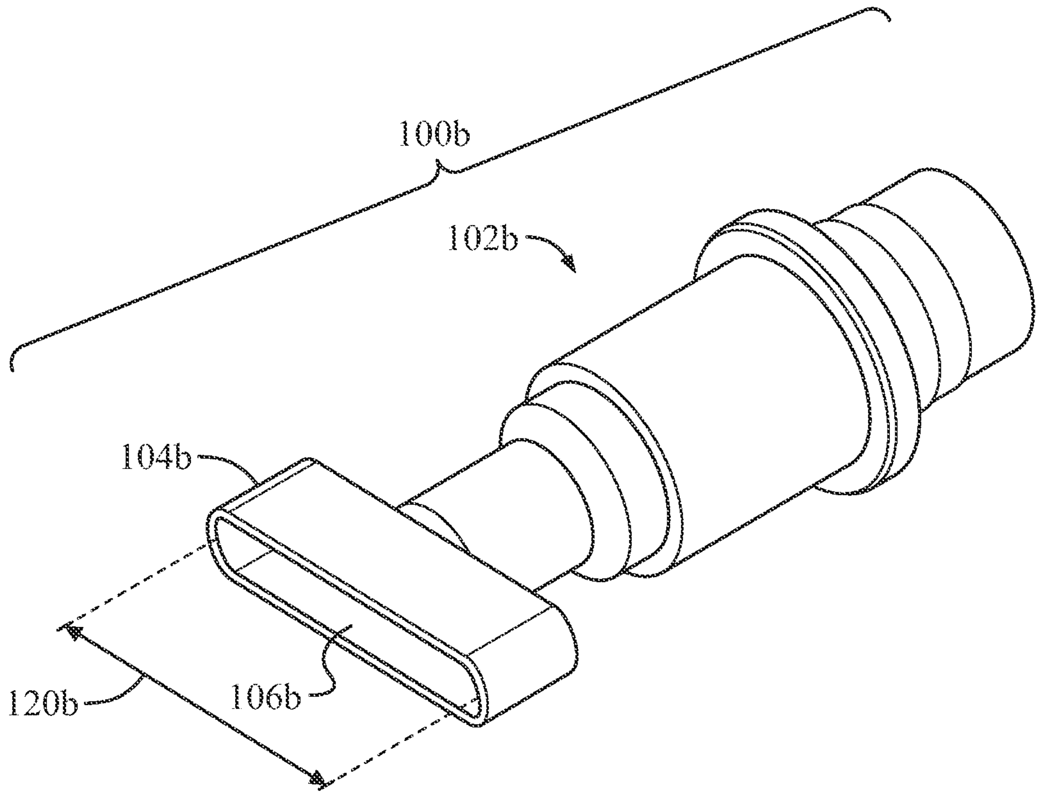
Figure 6A:
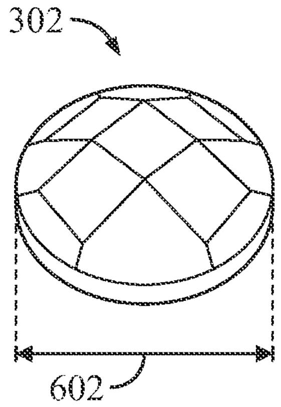
FIG. 6A shows a round diamond painting drill/bead.
Figure 6B:
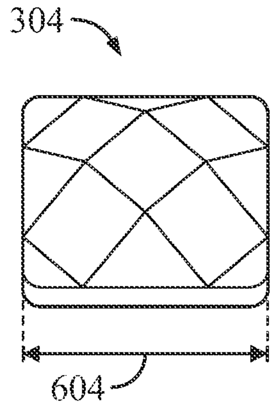
FIG. 6B shows a square diamond painting drill/bead.

The internal width 116 may be dimensioned such that the diamond drills do not get stuck in the wax well 106, and the external width 118 and body thicknesses 114*a-b* may be dimensioned such that the edges of the diamond drills extend outward from the multiplacer tip structure 104. As shown in FIG. 2, the multiplacer head 100 may be attached to a rear coupling bore 203 of a diamond art painting pen 200. As shown in FIGS. 3A and 3C, the multiplacer tip 104 of the multiplacer head 100 may be used to conveniently pick up a plurality of round 302 or square 304 diamond drills. As shown in FIGS. 3B and 3D, the round 302 or square 304 diamond drills may not sink inside the wax well 106 of the tip structure 104 and their edges 302*a*, 304*a* may extend outward of said structure. As shown in FIG. 4A-B, the diamond drills 302*a-c* that are picked up by the multiplacer head 100 may be placed on designated locations 402*a-c* on a diamond art painting canvas 400. Since the edges of the diamond drills are visible to the user when using the diamond art painting pen 200, as shown in FIG. 4A, the accurate placement of such drills may be more easier on the designated locations 402*a-c* on the canvas 400. As shown in FIGS. 5A-B, the multiplacer head 100 may come in different sizes. As shown in FIGS. 6A-B, the diamond drills may come in round 302 and square 304 shapes.

Referring specifically now to FIG. 1A, a perspective view of a diamond drill multiplacer head is shown. The diamond drill multiplacer head 100 may have a supporting body 102 between an attachment shaft 103 and a multiplacer tip structure 104. By way of example and not limitation, the supporting body 102 and the attachment shaft 103 may be considered a singular shaft having different thicknesses and contours along the length of the singular shaft body.

The attachment shaft 103 may be the portion of the multiplacer head 100 that is inserted into a rear coupling bore 203 (see FIG. 2) of a diamond art painting pen 200 to attach the multiplacer head 100 to the pen. By way of example and not limitation, the attachment shaft 103 may be cylindrical or rectangular. By way of example and not limitation, the attachment shaft 103 may have a cross-sectional dimension (e.g., diameter) that is less than the dimension (e.g., diameter) of the rear coupling bore 203 such that the attachment shaft 103 is loosely insertable and may slip out of the rear coupling bore 203 if an adhesive or fastening mechanism is not used to attached the two components together. By way of example and not limitation, an adhesive fluid, such as from a glue gun, or an adhesive tape, such as a washi tape, may be used to affix the attachment shaft 103 of the multiplacer head 100 to the rear bore 203 of the diamond art painting pen 200. Alternatively, the attachment shaft 103 may have a cross-sectional dimension (e.g., diameter) that makes the attachment shaft 103 fit tightly within the rear bore 203 of the diamond art painting pen and not let the attachment shaft 103 slip out.

The supporting body 102 may be a shaft in-line and part of the same body as the attachment shaft 103. By way of example and not limitation, the supporting body 102 may have a wide shaft portion 105*a* that tapers to a narrow shaft portion 105*b*. By way of example and not limitation, the wide shaft portion 105*a* may be proximate to the attachment shaft 103 and the narrow shaft portion 105*b* may be proximate to the multiplacer tip 104 and directly connected and attached to the rear wall of the multiplacer tip 104. By way of example and not limitation, the wide shaft portion 105*a* may be cylindrical having a greater thickness than the narrow shaft portion 105*b* that may also be cylindrical. By way of example and not limitation, the tapering portion 105*c* between the wide and narrow shaft portions 105*a-b* may reduce the thickness between the two portions conically.

By way of example and not limitation, there may exist a dividing protrusion 108 between the wide shaft portion 105*a* and the attachment shaft 103. The dividing protrusion 108 may be the structure that contacts the outer surfaces near the rear bore 203 (see FIG. 2) when the attachment shaft 103 is inserted in such bore of the diamond art painting pen 200. By way of example and not limitation, the supporting body 102, the attachment shaft 103, and the dividing protrusion 108 may be considered as a singular shaft having different thicknesses and contours along the length of the singular shaft body.

The multiplacer tip structure 104 may be at the opposite side of the supporting body 102 where the attachment shaft 103 is located. By way of example and not limitation, the multiplacer tip 104 may be connected and attached to the narrow shaft portion 105*b* of the supporting body 102. The multiplacer tip 104 may be the structural component that receives diamond painting drills/beads (see FIGS. 3A-D) to place such drills on the correct position on a diamond painting canvas (see FIGS. 4A-B). By way of example and not limitation, the mutliplacer tip 104 may have at tip body with two longitudinal sides (e.g., top and bottom sides), two lateral sides (e.g., left and right sides), a rear wall, and a wax well 106 therebetween. By way of example and not limitation, the multiplacer tip 104 may have a tip body with a stadium-shaped cross-section and a wax well 106 extending along a depth of the tip body and also having a stadium-shaped cross-sectional opening. Alternatively, the tip body and the wax well 106 may have rectangular or oval cross-sectional shapes.

By way of example and not limitation, the wax well 106 may be filled with wax 306 (see FIGS. 3A-D) or putty for picking up diamond drills/beads 302, 304. By way of example and not limitation, the wax well 106 may have a well depth 107 (see FIG. 1A) in the range of 2.0 to 6.0 mm. By way of example and not limitation, a wax well 106 having a well depth 107 that is shallow may be preferred to reduce the amount of wax or putty needed to fill in the wax well 106. By way of example and not limitation, the well depth 107 may be measured from the front opening of the wax well 106 in the body of the multiplacer tip 104 to the inner surface of the rear wall of the multiplacer tip 104, which the rear wall would be the rear surface of the wax well.

Referring now to FIG. 1B, a front view of the multiplacer head 100 is shown with an outline of some of the dimensions of the multiplacer tip 104. The dimensions of the multiplacer tip 104 may be important to ensure that the diamond drills 302, 304 (see FIGS. 3A-D) do not sink and get stuck into the wax well 106. Also, such dimensions may be important so that the multiplacer tip 104 does not visually block out the outer edges 302*a*, 304*a* of the diamond drills 302, 304 when the user is utilizing the mutliplacer head 100.

As shown in FIG. 1B, the multiplacer tip 104 may have body wall thicknesses 114*a-b* that extend along the longitudinal sides (e.g., top and bottom sides) and lateral sides (e.g., left and right sides) of the multiplacer tip 104. By way of example and not limitation, the wall thickness 114*a* of the longitudinal sides may extend between an inner surface 110 and an outer surface 112 of the multiplacer tip 104, specifically the inner and outer surfaces of each of the longitudinal sides. By way of example and not limitation, the wall thickness 114*b* of the lateral sides may extend between an inner surface 110 and an outer surface 112 of the multiplacer tip 104, specifically the inner and outer surfaces of each of the lateral sides. By way of example and not limitation, the wall thicknesses 114*a*-*b* of the longitudinal sides and lateral sides may equal to each other. By way of example and not limitation, the wall thickness 114*a* of the longitudinal sides may each be in a range between 0.20 mm and 1.0 mm. In an example, the wall thicknesses 114*a*-*b* of the longitudinal sides may be between 0.20 mm and 0.30 mm. By way of example and not limitation, the wall thickness 114*b* of the lateral sides may be in a range between 0.20 mm and 1.0 mm. In an example, the wall thickness 114*b* of the lateral sides may be between 0.20 mm and 0.30 mm. The wall thicknesses 114*a*-*b* may be preferred to be thinner than conventional multiplacer tips so that the outer edges 302*a*, 304*a* of the diamond drills 302, 304 (see FIGS. 3A-D) are visible to the user when the mutliplacer head 100 is attached to the diamond art painting pen 200. The outer edges 302*a*, 304*a* may need to be visible for the case of accurate placement of the diamond drills (see FIGS. 4A-B) on the diamond are canvas 400.

By way of example and not limitation, the internal width 116 of the multiplacer tip 104, which may constitute the width of the wax well 106, may be less than the cross-sectional diameter 602 of the round diamond drills 302 (see FIG. 6A) and the cross-sectional width 604 of the square diamond drills 304 (see FIG. 6B). Such a dimension for the internal width 116 may be necessary to prevent the round and square diamond drills 302, 304 from sinking inside the wax well 106 and getting stuck. To pick up the multiple diamond drills, a user may need to press the wax-filled 306 wax well 106 of the multiplacer tip 104 (see FIGS. 3A-D) on diamond drills 302, 304 for such drills to stick to the multiplacer tip 104. If the width of the wax well 106 is larger than the cross-sectional dimensions of the diamond drills 302, 304, then such drills may sink in the wax well 106 and get stuck. The diamond drills 302, 304 may then not properly stick to the diamond painting canvas 400 (see FIG. 4). Consequently, the internal width 116 (see FIG. 1B), which may be the width of the wax well 106, may be less than the cross-sectional dimensions of the diamond drills to prevent the sinking of such drills in the wax well 106 and to facilitate the accurate placement of the drills on the diamond painting canvas 400.

By way of example and not limitation, the internal width 116 may be measured from the two opposite inner surfaces 110 of the longitudinal sides of the multiplacer tip 104. By way of example and not limitation, the internal width 116 may be between % 60 to % 80 of the cross-sectional diameter 602 (see FIG. 6A) of the round diamond drill 302 or the cross-sectional width 604 (see FIG. 6B) of the square diamond drill 304. By way of example and not limitation, if a conventional round diamond drill 302 may have a cross sectional diameter 602 of 2.8 mm, then the internal width 116 (see FIG. 1A) may be between 1.68 mm (% 60 of the diameter) and 2.24 mm (% 80 of the diameter). By way of example and not limitation, if a conventional square diamond drill 304 has a cross-sectional width 604 of 2.5 mm, then the internal width 116 may be between 1.5 mm (% 60 of the width) and 2.0 mm (% 80 of the width).

The external width 118 of the multiplacer tip 104, which may constitute the total width of the of the multiplacer tip 104, may need to be less than the cross-sectional diameter 602 of the round diamond drills 302 (see FIG. 6A) and the cross-sectional width 604 of the square diamond drills 304 (see FIG. 6B). Such dimension of the external width 118 may be necessary so that the edges 302*a*, 304*a* of the diamond drills 302, 304 extend outward from the body of the multiplacer tip 104 and are visible (see FIGS. 3A-D) to the user when they are picked up by the diamond art painting pen 200. The visibility of the outer edges 302*a*, 304*a* of the diamond drills 302, 304 may be necessary for the accurate placement of such drills in the desired location on the canvas 400 (see FIG. 4A-B). Since multiple diamond drills are being placed on the canvas all at once, the accurate placement of the multiple diamond drills may be more difficult if the user cannot see the outer dimensions of the diamond drills extending from the sides of the multiplacer tip 104. Consequently, the external width 118 (see FIG. 1B) may be less than the cross-sectional dimensions of the diamond drills to facilitate accurate placement of the drills on the diamond painting canvas. In this way, the user can see the diamond drills when placing them onto the canvas as shown in FIGS. 4A-B.

By way of example and not limitation, the external width 118 may be measured from the two opposite outer surfaces 112 of the longitudinal sides of the multiplacer tip 104. By way of example and not limitation, the external width may be 70% to 90% the cross-sectional diameter 602 (see FIG. 6A) of the round diamond drill 302 or the cross-sectional width 604 (see FIG. 6B) of the square diamond drill 304. By way of example and not limitation, if a conventional round diamond drill 302 may have a cross sectional diameter 602 of 2.8 mm, then the external width 117 may be between 1.96 mm (% 70 of the diameter) and 2.52 mm (% 90 of the diameter). By way of example and not limitation, if a conventional square diamond drill 304 has a cross-sectional width 604 of 2.5 mm, then the external width 117 may be between 1.75 mm (% 70 of the width) and 2.25 mm (% 90 of the width). FIGS. 3A-D show how the outer edges of the diamond drills 302, 304 stick out from the body of the multiplacer tip 104.

As shown in FIG. 1B, the length 120 of the wax well 106 may determine how many diamond drills the multiplacer tip 104 may pick up. By way of example and not limitation, the length 120 of the wax well 106 may be between 5.0 mm to 44.8 mm, and the length 120 of the wax well 106 may be measured from the inner surfaces of the lateral sides of the multiplacer tip 104. FIG. 5A shows a multiplacer tip 104*a* having a wax well 106*a* with a length 120*a* on the longer range of the length spectrum described elsewhere herein, and FIG. 5B shows a multiplacer tip 104*b* having a wax well 106*b* with a length 120*b* on the shorter range of the length spectrum described elsewhere herein. Consequently, the multiplacer tip 104 may be designed to pick up multiple diamond drills ranging from two to 16 diamond drills depending on how long the length is. By way of example and not limitation, there may exist multiplacer tips for picking up two, three, four, six, eight, 10, 12, 14, or 16 diamond drills at the same time.

By way of example and not limitation, the diamond drill multiplacer head 100 may be made out of a steel alloy, such as 304 stainless steel. The diamond drill multiplacer 100 head may be made from a steel alloy to be more durable and to not break/bend when in use or when detaching the head from the diamond art painting pen 200 (see FIG. 2). The durability of the multiplacer head 100 may be an important concern since the multiplacer tip 104 is designed to have a thin wall thickness 114*a*-*b* (see FIG. 1B), as described elsewhere herein, which makes such structure more susceptible to bending and breaking. Consequently, a durable material such as stainless steel may be needed for the multiplacer tip 104 to compensate for the thinness of such structural component. Alternatively, the diamond drill multiplacer head 100 may be made from an aluminum or titanium alloy, or a polymer material.

Referring now to FIG. 2, a perspective view of a diamond art painting pen 200 having the multiplacer head 100 attached thereto is shown. The diamond painting pen 200 may have a pen shaft 202 for a user to grip the pen. By way of example and not limitation, the pen shaft 202 may have a front coupling bore 205 for the attachment of a single placer head 204 and a rear coupling bore 203 for the attachment of the multiplacer head 100. By way of example and not limitation, the single placer head 204 may have a single placer tip 206 that may be a hollow cylinder or rectangular prism shape for picking up single diamond drills.

Referring now to FIGS. 3A-D, the diamond art painting pen 200 picking up multiple round diamond drills 302 (FIG. 3A) or square diamond drills 304 (FIG. 3C) with the multiplacer head 100 is shown. By way of example and not limitation, the multiplacer head 100 may be attached to the rear coupling bore 203 of the diamond painting pen 200. By way of example and not limitation, the wax well 106 of the multiplacer head 100 may be filled with wax 306 or putty so the multiplacer tip 104 may be pressed against a plurality of diamond drills 302, 304 to pick them up. As shown in FIGS. 3A-D, the outer edges 302*a*, 304*a* of the diamond drills 302, 304 may stick outwards from the outer dimensions of the multiplacer tip 104 so that the user may see the diamond drills 302, 304 when trying to accurately place them on the canvas 400 using the pen 200 (see FIGS. 4A-B). The outer edges 302*a*, 304*a*, of the diamond drills 302, 304 sticking out may be because of the thinness of the wall thickness of the multiplacer tip 104 and the external width of the multiplacer tip 104 being less than the dimensions of the diamond drills 302, 304, as described elsewhere herein. As described elsewhere herein, a durable material such as a steel alloy (e.g., 304 stainless steel), may need to be used to manufacture the multiplacer head 100 since the multiplacer tip 104 is designed to have thin wall thicknesses.

Referring now to FIG. 4A-B, the usage of the multiplacer head 100 in placing multiple diamond drills on a diamond art painting canvas 400 is shown. The multiplacer head 100 may be used with the diamond painting pen 200 to place multiple diamond drills onto the canvas 400 at the same time. The diamond painting canvas 400 may have a plurality of color-coded marks 402*a-c* that correspond to the placement of different colored diamond drills 302*a-c*. By way of example and not limitation, the canvas 400 may be designed for either round diamond drills or square diamond drills. Since the outer edges 302*a*, 304*a* of the diamond drills 302, 304 stick outward from the body of the multiplacer tip 104 (see FIGS. 3A-D), a user may clearly see where the diamond drill is going to be placed on the canvas 400. Consequently, the user may more accurately place the diamond drills on their designated locations 402*a-c* on the painting canvas 400.

Referring now to FIGS. 5A-B, different multiplacer heads 100*a-b* having different lengths 120*a-b* for picking up different amounts of diamond drills is shown. FIG. 5A shows a long multiplacer head 100*a* having a multiplacer tip 104*a* with a long wax well 106*a* for picking up more diamond drills, as described elsewhere herein. FIG. 5B shows a short multiplacer head 100*b* having a multiplacer tip 104*b* with a short wax well 106*b* for picking up less diamond drills, as described elsewhere herein. By way of example and not limitation, the length 120*a-b* of the wax well 106*a-b* may be between 5.0 mm to 44.8 mm, and the length 120*a-b* of the wax well 106*a-b* may be measured from the inner surfaces of the lateral sides of the multiplacer tip 104*a-b*.

FIGS. 6A-B show the conventional round 302 and square 304 diamond drills, where the round diamond drill 302 may have a cross-sectional diameter 602 of approximately 2.8 mm and the square diamond drill 304 may have a cross-sectional width 604 of approximately 2.5 mm.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A multiplacer head for a diamond art painting pen, comprising: a supporting body having an attachment shaft on one end and a multiplacer tip structure on another end of the supporting body, the mutliplacer tip structure having a top longitudinal side, a bottom longitudinal side, a left lateral side, a right lateral side, and a wax well therebetween, the top and bottom longitudinal sides each having a wall thickness in the range of 0.22 to 0.30 mm, and the wax well having a width between 1.68 mm and 2.24 mm measured from an inner surface of the top longitudinal side and an inner surface of the bottom longitudinal side.

2. The multiplacer head of claim 1, wherein the wax well has a length in the range of 10.0 mm to 36.4 mm measured from an inner surface of the left lateral side and an inner surface of the right lateral side.

3. The multiplacer head of claim 1, wherein the multiplacer head is made from stainless steel.

4. The multiplacer head of claim 1, wherein the multiplacer tip structure and the wax well each have a stadium-shaped cross-section.

5. The multiplacer head of claim 1, wherein the wax well has a well depth in the range of 2.0 to 6.0 mm.

6. The multiplacer head of claim 1, wherein the supporting body has a cylindrical shaft section between the multiplacer tip structure and the attachment shaft.

7. The multiplacer head of claim 6, wherein the cylindrical shaft section has a wide shaft portion proximate to the attachment shaft and a narrow shaft portion proximate to the multiplacer tip structure.

8. The multiplacer head of claim 7, wherein the cylindrical shaft section has a tapering portion between the wide and narrow shaft portions.

9. The multiplacer head of claim 8, wherein the tapering portion conically reduces a shaft thickness of the cylindrical shaft section from the wide shaft portion to the narrow shaft portion.

10. The multiplacer head of claim 1, wherein the attachment shaft has a cross-sectional diameter less than a bore diameter of the diamond art painting pen such that the attachment shaft is loosely insertable inside a bore of the diamond art painting pen.

* * * * *